United States Patent [19]

Shirai

[11] Patent Number: 5,186,545
[45] Date of Patent: Feb. 16, 1993

[54] RECIPROCATING DEVICE
[75] Inventor: Takeki Shirai, Ichikawa, Japan
[73] Assignee: THK Co., Ltd., Tokyo, Japan
[21] Appl. No.: 748,945
[22] Filed: Aug. 23, 1991
[30] Foreign Application Priority Data Aug. 27, 1990 [JP] Japan .................................. 2-222629

[51] Int. Cl.$^5$ ........................ F16C 29/06; F16H 27/02
[52] U.S. Cl. .................................. 384/43; 74/89.2
[58] Field of Search ................................. 384/43–45; 74/89.15, 89.2, 424.8

[56] References Cited

U.S. PATENT DOCUMENTS

| 4,095,854 | 6/1978 | Teramachi | 384/45 |
| 4,778,284 | 10/1988 | Teramachi | 384/45 |
| 4,934,202 | 6/1990 | Hikita et al. | 74/89.2 X |
| 4,934,835 | 6/1990 | Albert | 384/43 |

FOREIGN PATENT DOCUMENTS

| 0367196 | 5/1990 | European Pat. Off. | |
| 200016 | 9/1987 | Japan | 384/43 |
| 1-320317 | 12/1989 | Japan | |
| 1216064 | 12/1970 | United Kingdom | 384/43 |

Primary Examiner—Thomas R. Hannon
Attorney, Agent, or Firm—Armstrong, Westerman, Hattori, McLeland & Naughton

[57] ABSTRACT

A reciprocating device has a construction, in which a slider is formed by fixing a table member to a bearing casing which is movable inside a track bed having a C-shaped section in a longitudinal direction thereof, and a continuous drive is disposed along the track bed for reciprocating the slider. A weight and sizes of the device can be reduced, and reciprocating motion without a pitching motion can be achieved. Accordingly, the invention can prevent generation of uncomfortable noises during a movement of the slider, and also can prevent reduction of durability of the device which may be caused by irregular wear of a bearing for guiding the slider.

9 Claims, 6 Drawing Sheets

RECIPROCATING DEVICE

FIELD OF THE INVENTION AND RELATED ART STATEMENT

The present invention relates to a reciprocating device particularly for smoothly and linearly reciprocating a predetermined member or object to which a load is applied.

Such reciprocating devices are well known that a large number of balls are rotatably disposed in endless paths and these balls rotate and circulate through the endless paths. An example of such reciprocating devices is disclosed in the Japanese Laid-Open Patent publication No. 1-320317 (320317/1989).

The reciprocating device disclosed in this publication is basically formed of, as shown in FIGS. 7-10, an elongated guide casing 60, a guide rail 62 disposed in the guide casing 60 and extending along a longitudinal axis thereof, a traveler 64 which is slidable along the guide rail 62, linear bearing mechanisms each having a large number of balls 66a which individually rotate in a pair of vertically spaced endless paths, the linear bearing mechanisms being disposed between the guide rail 62 and the traveler 64, and a linear drive device 68 for moving the traveler 64 with respect to the guide rail 62.

This linear drive device 68 is formed of, as best shown in FIG. 10, a flexible tension member, i.e., a toothed belt 74 which extends from the traveler 64, is deflected at opposite end areas of the guide casing 60 toward the traveler 64 by deflection guide rolls 70 and 72 and is fixed thereto. This toothed belt 74 runs in a plane perpendicular to the endless paths of the linear bearings 66, and has a middle region 74a which runs along a bottom surface of the guide casing 60 in order to achieve a compact construction of the whole device. Therefore, the connecting points of the traveler 64 and the toothed belt 74 are spaced by a relatively long distance from a position at which the balls 66a of the linear bearing mechanisms 66 are supported by the ball supporting paths of the guide rail 62, because the deflection guide rolls 70 and 72 have large diameters.

This distance is also increased by a fact that the employed linear bearing mechanisms 66 have pairs of vertically spaced endless paths.

As described above, in the prior art reciprocating device, a point of application of the force for driving the device is spaced by a considerably long distance from a position at which the balls are supported by the ball supporting path grooves of the guide rail 62, so that a large angular moment is applied to a driven member. Therefore, a wavy motion or pitching motion is caused in the driven member during reciprocating, which prevents smooth transportation. This also causes noise and an irregular wear of bearing surfaces, resulting in reduction of durability.

OBJECT AND SUMMARY OF THE INVENTION

It is an object of the invention to overcome the problems of the prior art described above, to prevent a wavy motion which may be caused when a reciprocating device is driven and to reduce noise generated when the device is driven.

A reciprocating device according to the invention comprises: a track bed having a base and a pair of flanges, which are perpendicularly projected from the base with a predetermined space between each other and each are provided at the inner surface with one ball rolling groove extending in a reciprocating direction; a bearing casing formed of a pair of upper and lower plates provided with annular grooves and coupled together, said coupled plates forming a pair of endless ball tracks each of which is formed of a linear load ball region, a no-load ball region and turning regions connecting them; a large number of balls which circulate along the endless ball tracks in the bearing casing, said load ball regions being provided with recesses through which the balls partially project and are rotatably fitted in the ball rolling grooves in the track bed for slidably supporting the bearing casing with respect to the track bed; a table member fixed to an upper portion of the bearing casing for cooperating with the bearing casing to form a slider; and drive means which runs in a plane parallel to the endless ball tracks and having a portion fixed to the slider for reciprocatively driving the slider with respect to the track bed.

According to the features of the invention described above, the drive means such as a chain, wire or belt which runs in the plane parallel to the endless tracks is reciprocated by an appropriate drive source, e.g., a motor. Thereby, the bearing casing and the table member are smoothly reciprocated with respect to the track bed by means of the balls which partially project through the recesses provided in the no-load ball regions in the endless ball tracks and are fitted in the ball rolling grooves. Since the belt or the like runs in the plane parallel to the endless ball tracks, a distance from a point of application of a driving force by the motor to the belt or the like to supporting points in which the balls are supported by the rolling grooves is reduced. Further, the bearing casing is formed of the paired upper and lower plates provided with the concave grooves and these plates are coupled to form a pair of the endless ball tracks including the linear load ball regions, no-load ball regions and turning regions connecting them. Therefore, the bearing casing has a reduced vertical thickness, and thus the whole device has a small height. Thereby, the table member with an object mounted thereon has a small inertia force when it starts or stops.

According to the reciprocating device of the invention, since there is a short distance between the point at which the driving force is applied by the drive means such as a motor to the driven means and the supporting points at which the balls are supported by the ball rolling grooves, a moment applied to the slider formed of the bearing casing and the table member is reduced, and thus wavy motion of an assembly which may be caused by the moment is suppressed.

Therefore, the reciprocating device of the invention enables remarkably smooth reciprocating motion, as compared with the prior art, and also can reduce noises during operations.

DETAILED DESCRIPTION OF THE PREFERRED EMBODIMENTS

Specific embodiments of a reciprocating device of the invention will be described below with reference to the accompanying drawings.

Figure 1:
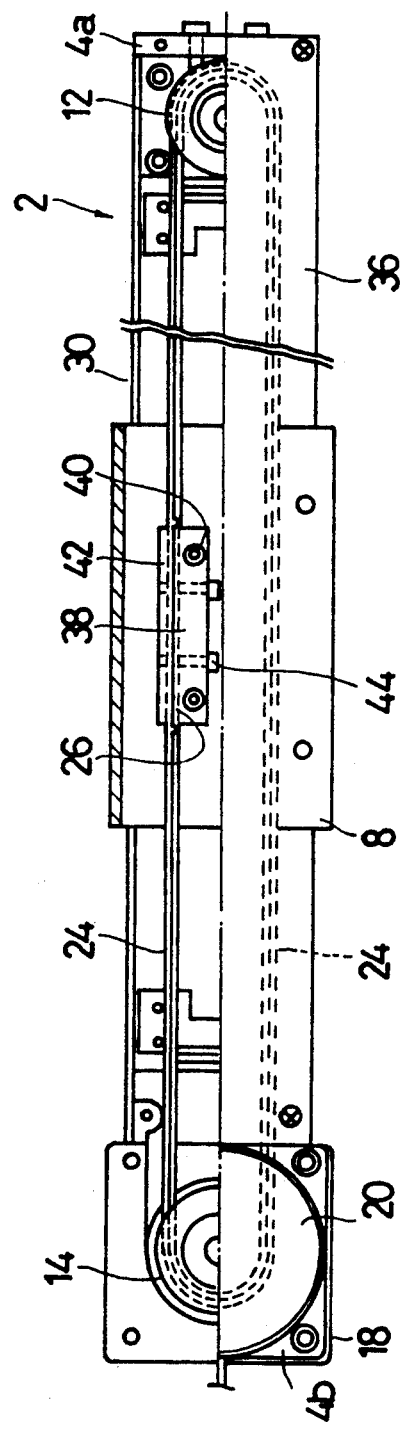
FIG. 1 is a plan view illustrating an embodiment of the reciprocating device according to the invention, in which an upper half of the Figure shows a portion lower than a belt and a lower half shows a top view.
Figure 2:
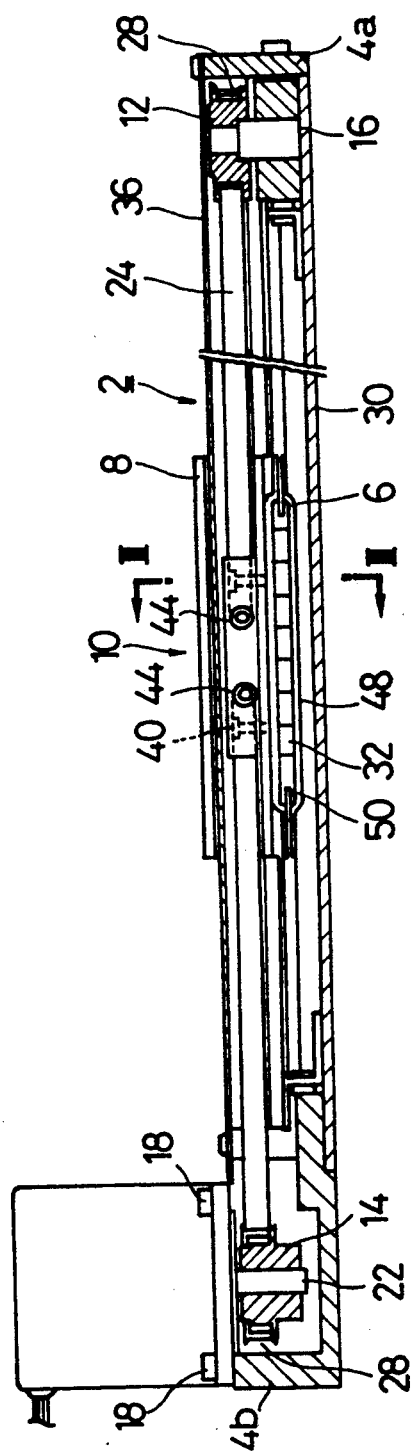
FIG. 2 is a side view of a reciprocating device shown in FIG. 1.
Figure 3:
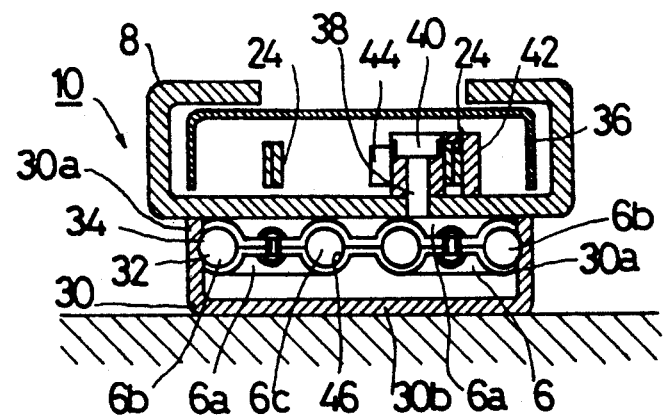
FIG. 3 is a cross section taken along line III—III in FIG. 2.

A reciprocating device 2 according to the invention is formed, as shown in FIGS. 1-3, a track bed 30, a slider 10 having a bearing casing 6 which is reciprocatively slidable along the track bed 30 and a table member 8 fixed to an upper portion of the bearing casing 6, pulleys mounted at longitudinally opposite ends of the track bed 30 and a belt 24 retained around these pulleys 12 and 14 for driving the slider 10.

Figure 4:
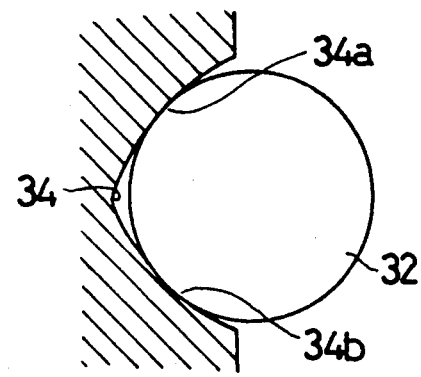
FIG. 4 is a schematic view for illustrating a relationship between a ball and a ball rolling groove.

The track bed 30 has a C-shaped section and is formed of a base 30b and a pair of flanges 30a perpendicularly projected from opposite sides of the base 30b. At an inner side of each flange 30a, one ball rolling groove 34 linearly extends parallel to a running direction of the belt 24 for supporting balls 32 in the bearing casing 6, as will be described later. As shown in FIG. 4, the ball rolling groove 34 is formed of two ball rolling surfaces 34a and 34b which intersects each other and has a cross section of a Gothic arch shape. In FIG. 3, the base 30b and the paired flanges 30a of the track bed 30 are formed by an integral member. However, members which have L-shaped cross sections and are provided with the ball rolling grooves 34 may be disposed on the upper surface of the base with the ball rolling grooves 34 faced inwardly.

Brackets 4a and 4b are fixed at the opposite ends of the track bed 30 for supporting the pulleys 12 and 14, respectively. In the Figure, the pulley 12 is an idle pulley and is rotatably supported by a shaft 16 mounted in the bracket 4a. The pulley 14 is a drive pulley, above which an electrical motor 20, i.e., a step motor is disposed and is fastened to the bracket 4b by bolts 18. The pulley 14 is fixed to a rotary shaft 22 of the electric motor 20. The belt 24 is retained around the pulleys 12 and 14. The pulleys 12 and 14 are provided at their inner surfaces with a plurality of teeth 26, which engage teeth 26 provided at engagement grooves 28 of the pulleys 12 and 14 for enabling accurate motion control without slip. If the accurate motion control is not required, the teeth 26 of the belt 24 and the engagement grooves 28 of the pulleys 12 and 14 may be eliminated.

The pulley 12 and the belt 24 are covered from the upper side with a cover 36 having a C-shaped section, so that the pulley 12 and the belt 24 may not be exposed to the exterior and an article or member (not shown) on the table member 8 may not fall into the track bed. The cover 36 is fixed at its opposite ends to the brackets 4a and 4b.

Then, description will be made with respect to a slider which is reciprocated inside the track bed 30 by the belt 24. As shown in FIGS. 2 and 3, this slider is formed of the bearing casing 6 and the table member 8.

The table member 8 is located above the track bed 30 and the bearing casing 6. The table member 8 has a substantially rectangular shape in a top view, and has a hollow rectangular cross section recessed at an upper portion as shown in FIG. 3. The table member 8 may be manufactured from a sheet by a press working. A hollow portion in the table member 8 forms a space through which the belt 24 retained around the pulleys 12 and 14 and the cover 36 pass. The table member 8 reciprocates, surrounding the belt 24 and the cover 36. An elongated fixing block member 38 is fixed onto the bottom portion of the table member 8 by bolts 40. An attaching block 42 is engaged to the fixing block member 38 by bolts 44. The belt 24 has a portion pinched between the fixing block member 38 and the attaching block 42, and thus is fixed to the table member 8.

In FIG. 3, although the cover 36 is located at the hollow portion in the table member 8, it may be located outside the table member 8 covering an opening of the table member 8.

The table member 8 is fixed at a position above the bearing casing 6 by appropriate means such as welding.

The bearing casing 6 is formed of a pair of upper and lower plates 6a, each of which is provided with a pair of annularly extending grooves forming upper and lower halves of a pair of endless ball tracks 46. Each track 46 is formed of a linear load ball region 6b, a no-load ball region 6c and return regions (not shown) connecting them.

Each plate 6a is manufactured by a press working of, e.g., a thin steel plate. The bearing casing 6 is an assembly of the paired plates 6a which are opposed to each other and are jointed by appropriate means such as spot welding or riveting in the illustrated embodiment. The bearing casing 6 has a wear resistance increased by surface hardening such as nitriding.

The bearing casing 6 is provided at its opposite side walls defining the linear load ball regions 6b with windows or recesses 48. The balls 32 located at the linear load ball regions 6b partially project outwardly through the recesses 48. The balls 32 projected from the endless ball tracks to the outside of the bearing casing 6 are rotatably fitted with the ball rolling grooves 34 in the track bed 30 described above. Since the ball rolling grooves 34 have the cross sections of the Gothic arch shapes defined by the ball rolling surfaces 34a and 34b, as described before, each ball 32 projected through the recess 48 contacts the surface of the ball rolling groove 34 through two points, as shown in FIG. 4. Therefore, as compared with the prior art device in which each ball contacts the surface of the ball rolling groove through one point, the illustrated embodiment can increase the stability of movement with respect to a moment load.

According to the construction described above, since the bearing casing 6 can freely reciprocate in the track bed owing to rolling of the balls 32, the belt 24 fixed to the table member 8 may be rotated through a predetermined extent by the electric motor 20 for applying a reciprocating motion of a stroke corresponding to the rotated extent of the belt 24 to the slider 10.

Figure 5:
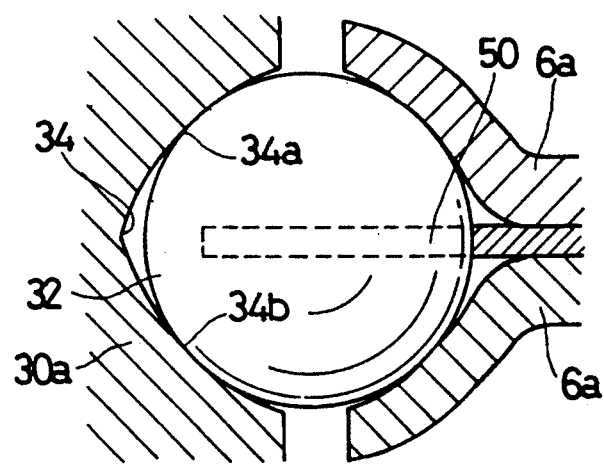
FIG. 5 is a schematic view showing one of tongues provided at opposite ends of recesses.

Further, as shown in FIGS. 2 and 5, at opposite ends of each recess 48 provided at the load ball region in the bearing casing 6, there are provided tongues 50 extending into spaces between the balls 32 located at the endmost positions of the recess 48 and a central portion of the ball rolling groove 34 of the Gothic arch shape. The tongues 50 serves to enable smooth entry of the loaded balls 32, which are rotated by the movement of the bearing casing 6, into the no-load region in the endless track 46. Since the balls are smoothly scooped from the load regions to the no-load regions by the tongues 50 provided at the opposite ends of the recesses, noises which may be caused by collision of the balls can be reduced.

Figure 6:
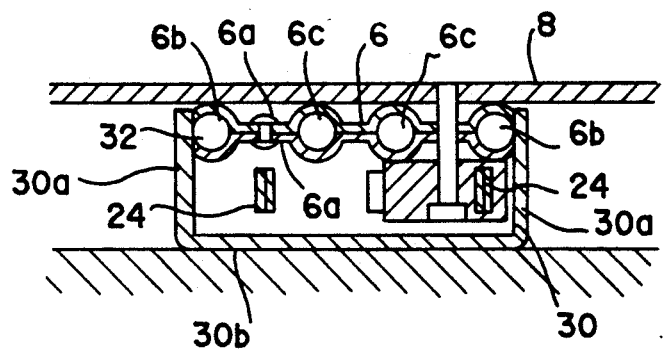
FIG. 6 is a cross section corresponding to FIG. 3 and illustrating an embodiment different from the reciprocating device shown in FIGS. 1-3.
Figure 7:
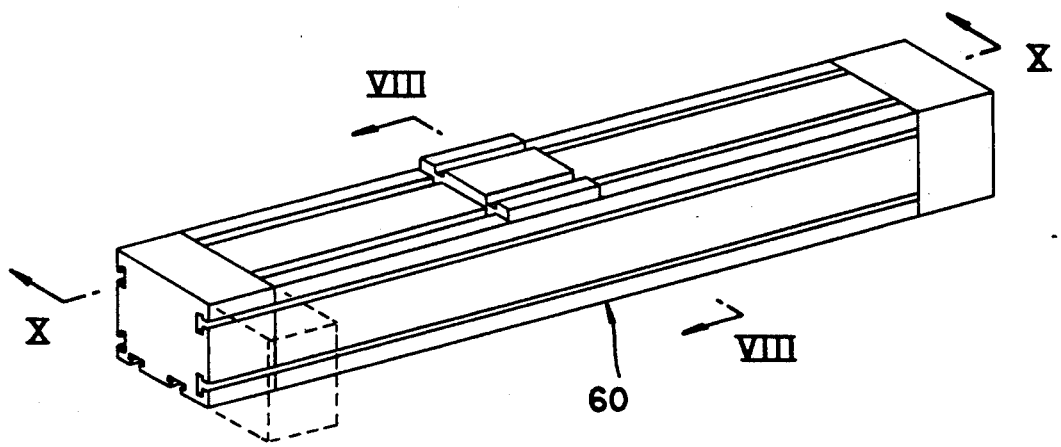
FIG. 7 is a perspective view illustrating an example of a reciprocating device in the prior art.
Figure 8:
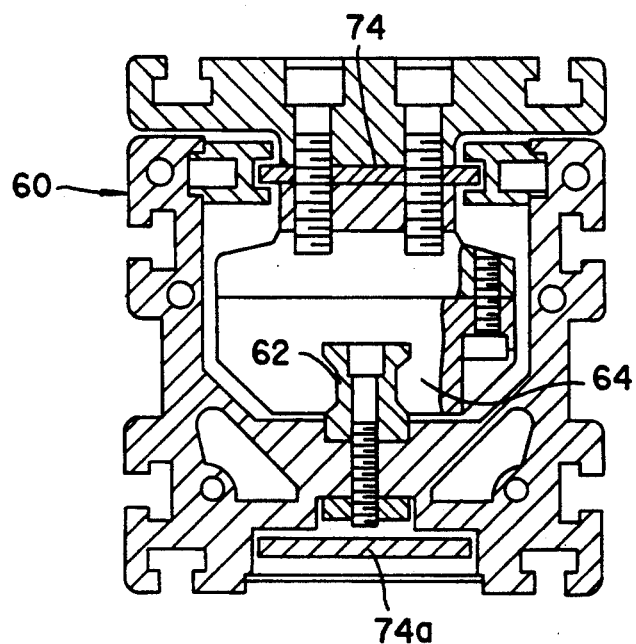
FIG. 8 is a cross section taken along line VIII—VIII in FIG. 7.
Figure 9:
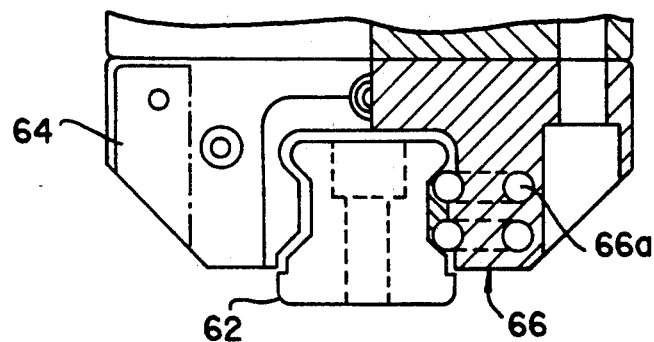
FIG. 9 is a schematic view for illustrating a relationship between a ball and a ball rolling groove.
Figure 10:
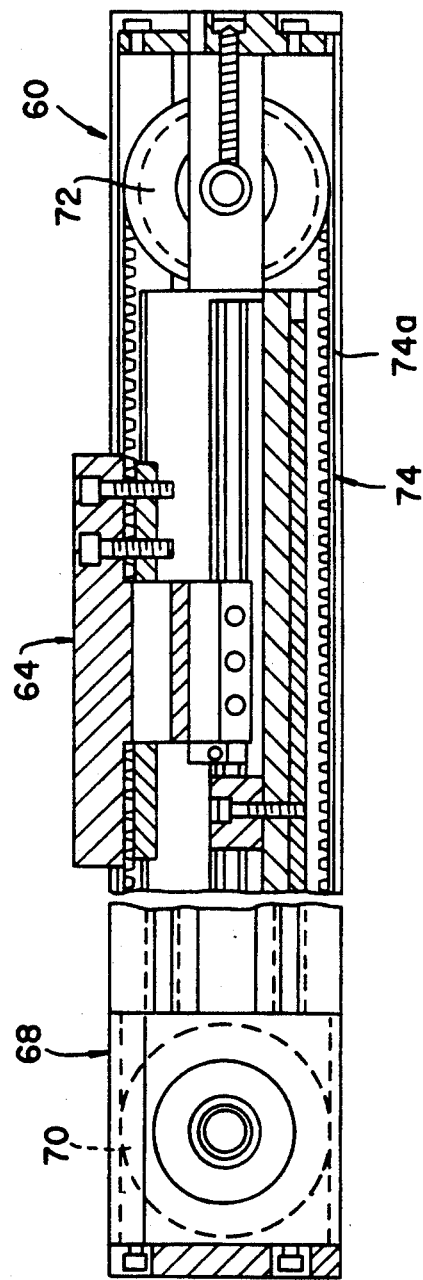
FIG. 10 is a longitudinal section taken along line X—X in FIG. 7.

In the above embodiment, the belt 24 is disposed at the hollow portion of the table member 8. However, as shown in FIG. 6, the belt 24 may be disposed below the slider 10 formed of the bearing casing 6 and the table member 8 and may be accommodated in the track bed 30.

What is claimed is:

1. A reciprocating device comprising:
   a track bed having a base and a pair of flanges perpendicularly projected from said base with a predetermined space between each flange and each flange is provided at an inner surface with one ball rolling groove extending in a reciprocating direction;
   a bearing casing formed of a pair of upper and lower plates provided with annular grooves and coupled together, said coupled plates forming a pair of endless ball tracks each of which is formed of a linear load ball region, a no-load ball region and turning regions connecting them;
   a large number of balls which circulate along said endless ball tracks in said bearing casing, said load ball regions being provided with recesses through which said balls partially project and are rotatably fitted in said ball rolling grooves in said track bed for slidably supporting said bearing casing with respect to said track bed;
   a plate-like table member fixed to an upper portion of said bearing casing and cooperating with said bearing casing to form a slider; and
   drive means including a motor, a continuous drive member driven by said motor, and a pair of pullies with each pulley rotatably mounted at one end of said track with said driven member rounded about each of said pullies and running in a plane parallel to said endless ball tracks; and
   means fixing said continuous drive member to said slider, whereby said motor reciprocatively drives said continuous drive member and said slider with respect to said track bed.

2. A reciprocating device as claimed in claim 1 wherein said continuous drive member is a belt.

3. A reciprocating device as claimed in claim 1 wherein each of said ball rolling grooves in the track bed is defined by two ball rolling surfaces intersecting each other, and has a cross section of a Gothic arch shape.

4. A reciprocating device as claimed in claim 1 wherein said bearing casing is provided at opposite ends of said recesses formed in the load ball regions with tongues extending into spaces between said balls and central portions of said ball rolling grooves, respectively.

5. A reciprocating device as claimed in claim 1 wherein said continuous drive member is a chain.

6. A reciprocating device as claimed in claim 1 wherein said continuous drive member is a wire.

7. A reciprocating device as claimed in claim 1 wherein said means fixing said drive member to said slider is fixed to an upper portion of said table member.

8. A reciprocating device as claimed in claim 1 wherein said means fixing said drive member to said slider is fixed to a lower portion of said bearing casing and said drive member rounds said pullies internally of a channel formed by said track bed.

9. A reciprocating device as claimed in claim 1 wherein said pullies are mounted for rotation on vertical spindles.

* * * * *